United States Patent [19]
Hand et al.

[11] Patent Number: 5,353,556
[45] Date of Patent: Oct. 11, 1994

[54] METHOD AND APPARATUS FOR PREVENTING CRAWLING INSECTS OR OTHER CRAWLING PESTS FROM GAINING ACCESS TO PLANTS

[76] Inventors: Herbert H. Hand, 223 Tram Rd., Columbia, S.C. 29201; Herbert G. Hand, 5426 Richenbacher Ave., Apt. #301, Alexandria, Va. 22304

[21] Appl. No.: 570,339

[22] Filed: Aug. 21, 1990

Related U.S. Application Data

[63] Continuation-in-part of Ser. No. 436,412, Nov. 14, 1989, abandoned, which is a continuation-in-part of Ser. No. 271,040, Nov. 15, 1988, Pat. No. 4,905,629, which is a continuation-in-part of Ser. No. 133,171, Dec. 11, 1987, Pat. No. 4,784,086, which is a continuation-in-part of Ser. No. 914,335, Oct. 2, 1986, abandoned.

[51] Int. Cl.$^5$ .......................... A01M 1/00; A01K 1/00
[52] U.S. Cl. .......................... 52/101; 119/61; 43/108
[58] Field of Search .................. 52/58, 62, 101, 293; 119/61; 43/121, 132, 133, 108, 126

[56] References Cited

U.S. PATENT DOCUMENTS

| | | |
|---|---|---|
| 42 | 4/1841 | Newhall . |
| 44,238 | 9/1864 | Towne ........................ 43/108 |
| 46,298 | 2/1865 | Hilton . |
| 49,453 | 8/1865 | Starbuck . |
| 57,937 | 9/1866 | Mathews ..................... 43/108 |
| 479,980 | 8/1892 | Gordon . |
| 481,311 | 8/1892 | Smith .......................... 43/108 |
| 784,684 | 3/1905 | Karlsen ........................ 43/108 |
| 1,221,999 | 4/1917 | Kreiter . |
| 1,496,720 | 6/1924 | Marsico ....................... 43/108 |
| 1,579,534 | 4/1926 | Hibbard et al. ............. 43/108 |
| 2,012,651 | 8/1935 | Beall . |
| 2,112,229 | 3/1938 | Davis . |
| 2,138,182 | 11/1938 | Lipthrott . |
| 2,139,225 | 12/1938 | Easling . |
| 2,149,495 | 3/1939 | Barnard et al. . |
| 2,150,891 | 3/1939 | Tennison . |
| 2,165,500 | 7/1939 | Muirhead . |
| 2,191,811 | 2/1940 | Trampier, Sr. . |
| 2,242,266 | 5/1941 | Scales . |
| 2,253,541 | 8/1941 | Torbett ......................... 43/108 |
| 2,258,317 | 10/1941 | Clipper . |
| 2,315,989 | 4/1943 | Tennison et al. . |
| 2,554,086 | 5/1951 | Block . |
| 2,584,301 | 2/1952 | Sinclair . |
| 2,677,350 | 5/1954 | Prestidge et al. . |
| 2,746,201 | 5/1956 | Warrell ........................ 43/108 |
| 2,772,476 | 3/1973 | Van Ness et al. . |
| 2,796,042 | 6/1957 | Cope . |
| 2,813,509 | 11/1957 | Bruno . |
| 3,147,739 | 9/1964 | Shaheen . |
| 3,195,510 | 7/1965 | Bernstein . |
| 3,441,003 | 4/1969 | DuMond et al. . |
| 3,664,304 | 5/1972 | Carter . |
| 3,995,595 | 12/1976 | Williams . |
| 4,098,018 | 7/1978 | Bartelme ..................... 43/108 |
| 4,128,080 | 12/1978 | Haney . |
| 4,328,636 | 5/1982 | Johnson . |
| 4,357,905 | 11/1982 | Carpenter . |
| 4,399,772 | 8/1983 | Salinas . |
| 4,423,564 | 1/1984 | Davies et al. . |
| 4,428,325 | 1/1984 | Koch . |
| 4,471,562 | 9/1984 | Beucker ....................... 43/108 |
| 4,691,664 | 9/1987 | Crowell . |
| 4,756,116 | 7/1988 | Cutter ........................... 43/108 |
| 4,784,086 | 11/1988 | Hand et al. . |
| 4,800,845 | 1/1989 | Budd . |
| 4,905,629 | 3/1990 | Hand et al. . |

FOREIGN PATENT DOCUMENTS 2453952 12/1980 France .
472883 10/1937 United Kingdom .

*Primary Examiner*—Peter M. Cuomo
*Assistant Examiner*—Suzanne L. Dino
*Attorney, Agent, or Firm*—McAndrews, Held & Malloy, Ltd.

[57] ABSTRACT

An insect or pest preventer for preventing crawling insects or pests from reaching plants, trees or attractant supporting structures such as plant tables, picnic tables, etc. A combination of -tactic, ultraviolet light and other barriers are positioned with respect to the path of travel of the insect.

21 Claims, 3 Drawing Sheets

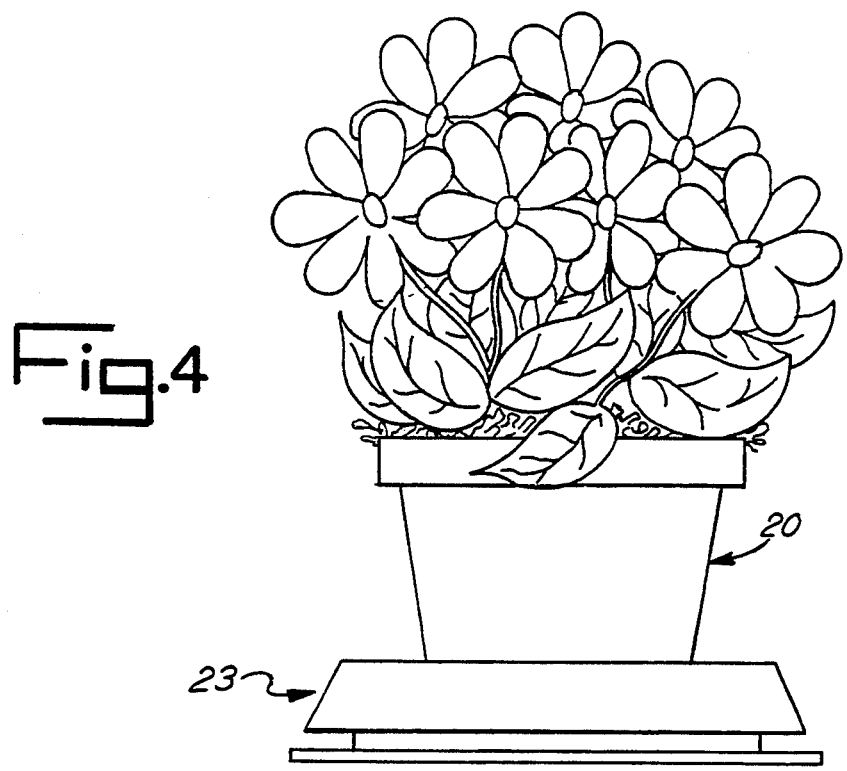
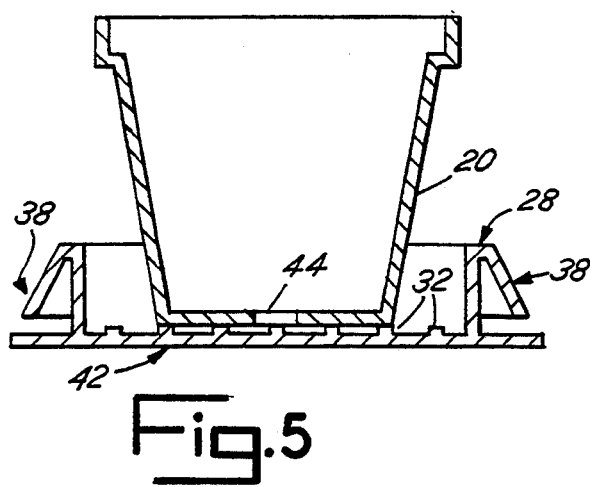
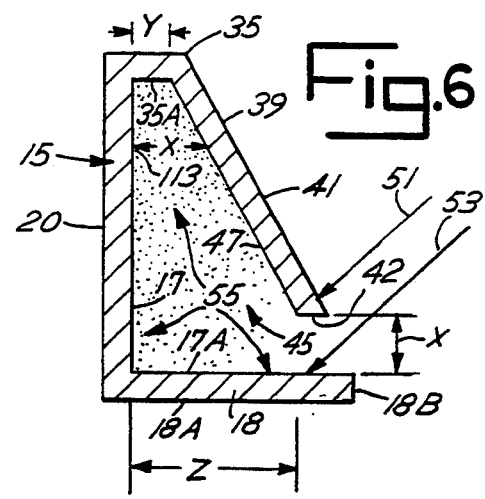
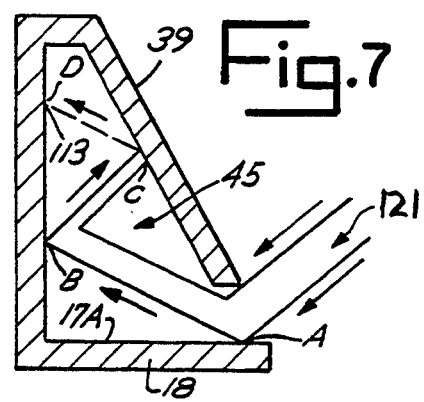

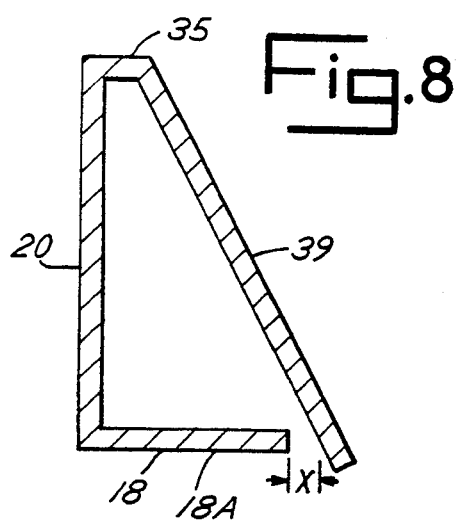
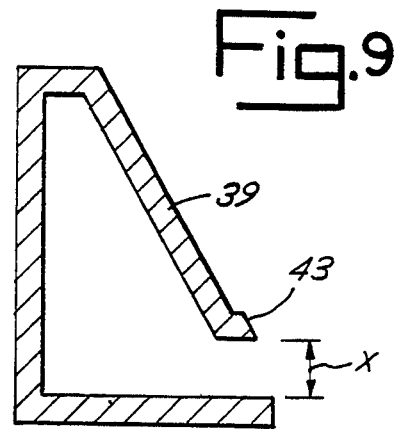
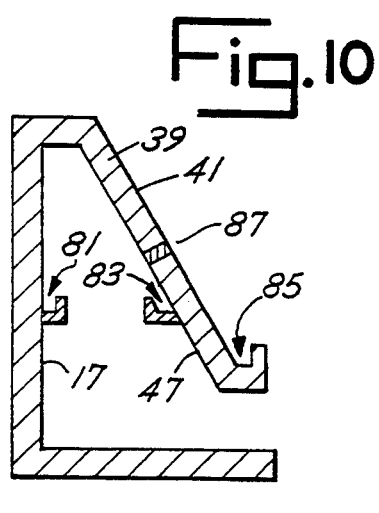
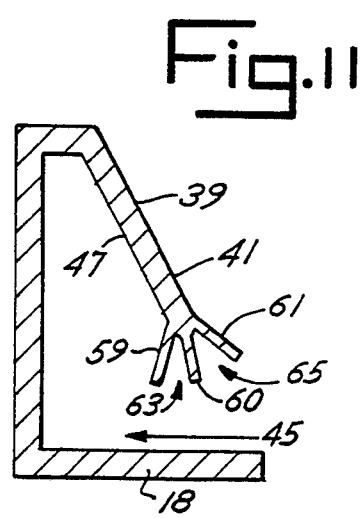
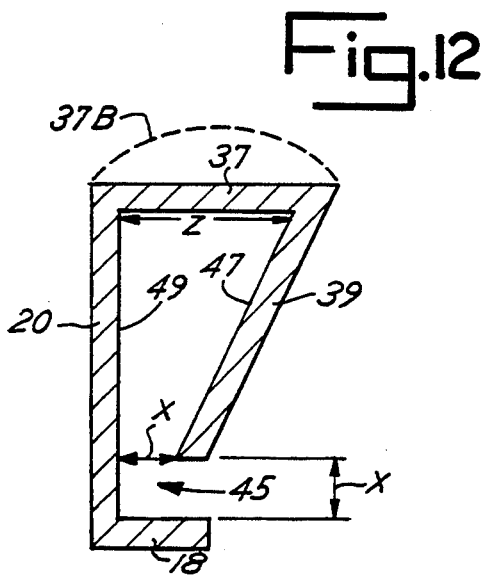
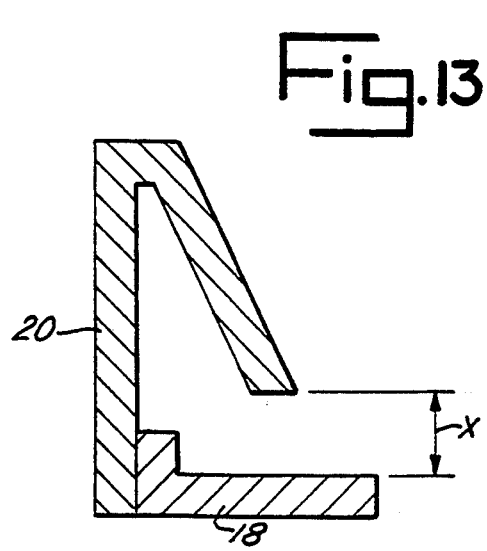

5,353,556

1

METHOD AND APPARATUS FOR PREVENTING CRAWLING INSECTS OR OTHER CRAWLING PESTS FROM GAINING ACCESS TO PLANTS

RELATED PATENT APPLICATIONS

This application is a continuation-in-part of application Ser. No. 07/436,412 filed Nov. 14, 1989, which is a continuation-in-part of application Ser. No. 07/271,040, filed Nov. 15, 1988, now U.S. Pat. No. 4,905,629, which is a continuation-in-part of application Ser. No. 07/133,171 filed Dec. 11, 1987, now U.S. Pat. No. 4,784,086, which is a continuation-in-part of application Ser. No. 914,335 filed Oct. 2, 1986, now abandoned. All of these prior applications are incorporated herein by reference. Additionally, pending application, Ser. No. 07/434,411, filed Nov. 13, 1989, and now U.S. Pat. No. 5,097,041, is also incorporated herein by reference.

BACKGROUND OF THE INVENTION

This invention relates to a method and apparatus for preventing access to plants, trees, or tables or susceptible sections of plants or trees by crawling insects or other crawling pests. More particularly, this invention relates to a method and apparatus for preventing crawling insects or other crawling pests from crawling to attractant supporting sections of structures such as a table or a flower pot support by imposing a barrier which will disrupt the pests' navigation and orientation mechanisms. The invention further relates to a method and apparatus for preventing crawling insects or other crawling pests from gaining access to susceptible sections of plants, trees or tables.

At the present time, the most common method for preventing crawling insects or other crawling pests from damaging plants or trees is to apply chemicals which may be poisonous to or around the plants or trees. Such chemicals may have adverse environmental impacts and may not be suitable for use with plants or tree products which will eventually become foodstuffs. Additionally, the effective period of such chemicals is usually limited necessitating repeated application of chemicals.

Therefore, it is an object of the present invention to provide a physical barrier to crawling insects or other crawling pests. This barrier has members arranged in a particular manner which prevent crawling insects and other crawling pests from reaching the table, the plant, the food stuff growing on a tree, a plant, the attractant support mechanism or the susceptible area of a plant or tree in the case of an accessible plant or tree.

It is a further object of the present invention to provide unobtrusive devices that are relatively inexpensive, easy to install, easy to include in the manufacture of a plant support, quick to maintain, and environmentally safe, while having physical and other barriers for preventing crawling insects and other crawling pests from reaching a table, a plant, a tree or a susceptible section of a plant or tree.

It is a further object of the invention to provide an assembly which may be added to an attractant support mechanism either when manufactured or as a subsequent addition to the support or as an integral portion of a support mechanism at the time the support is manufactured.

It is a further object of the invention to provide a method and apparatus which prevents crawling insects and other crawling pests from access to a plant, tree, table, or a susceptible section of a plant or tree which has minimal effect on the plant or tree.

SUMMARY OF THE INVENTION

These and other objects of the invention are achieved by an assembly which may be manufactured as an integral part of or securely bonded to an attractant support structure, or may be secured to a plant or tree between a susceptible area of the plant or tree and a section of the plant or tree to which crawling insects or other crawling pests may have access. Several embodiments of the invention may be applied to different attractant support structures or plants. The assembly includes an inner wall which provides a pathway leading from the lower part of the support and/or plant toward an upper edge of the inner wall. A physical obstacle wall extends downward from the upper edge and cooperates with the inner wall to provide multiple -tactic, stereokinetic, elevation topographic, electrical impulse sensing, heat sensing, olfactory sensing and ultraviolet light barriers.

BRIEF DESCRIPTION OF THE DRAWINGS

FIG. 4 Is an illustration of an embodiment of a flower pot holder having a crawling insects barrier.

FIG. 5 is a cross-sectional side view of the flower pot holder of FIG. 4.

FIG. 6 is a cross-sectional side view of a barrier according to the present invention showing interference with light rays 51, 53.

FIG. 7 is a cross-sectional side view of a portion of a barrier according to the present invention showing interference with ultraviolet light 121.

FIG. 8 is a cross-sectional side view of an another embodiment of a barrier according to the present invention.

FIG. 9 is a cross-sectional side view of an alternate embodiment of a barrier according to the present invention.

FIG. 10 is a cross-sectional side view of a barrier according to the present invention showing interior and exterior moats.

FIG. 11 is a cross-sectional side view of a barrier according to the present invention showing multiple physical obstacles.

FIG. 12 is a cross-sectional side view of a barrier according to the present invention.

FIG. 13 is a cross-sectional side view of a barrier according to the present invention.

DETAILED DESCRIPTION OF THE PREFERRED EMBODIMENT

Figure 1:
FIG. 1 an illustration of an embodiment of a crawling pest barrier which is secured to the trunk of a tree to prevent crawling pests from gaining access to the trunk, leafy, fruit bearing, or nut bearing sections of the tree.

Referring to FIG. 1, a preclusion barrier 10 surrounds the trunk of a tree for preventing insects or other crawling pests from reaching the trunk, leaves, fruit bearing, and/or nut bearing canopy of the tree. The barrier is of a size to closely conform to the outer surface of the tree trunk and to prevent passage of insects or other crawling pests between barrier 10 and the tree. The barrier is secured to the tree by conventional means fixing the barrier at a distance above the ground sufficient to prevent circumvention of the barrier through debris which may be deposited at the base of the tree. A filler or bonding agent may be applied between the barrier 10 and the tree to prevent crawling insects from traveling between the barrier inner wall and the tree.

Figure 2:
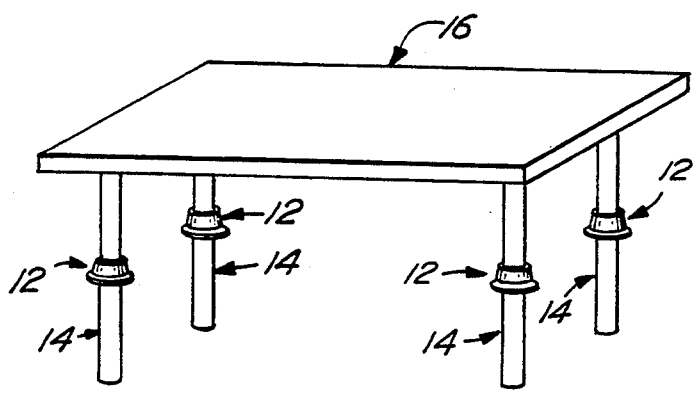
FIG. 2 is an illustration of an embodiment of a plant table having a crawling insect or other crawling pest barriers attached to legs of the table to prevent crawling pests from gaining access to the top of the table.

As shown in FIG. 2, an attractant supporting structure, such as a plant table 16, includes a flat top surface for supporting flower pots, potted plants or edible material. Such a structure may be used in greenhouses, in plant shops, picnic tables, etc. Leg guard barriers 12 are secured to each of legs 14, for preventing crawling pests from reaching the top surface of structure 16. Leg barriers 12 are affixed to legs 14 at a distance above the floor or ground to prevent circumvention of the barrier by articles which may be placed against the legs 14 of structure 16. A filler or bonding agent may be applied between barriers 12 and legs 14 if necessary to prevent insects from crawling between the inner wall of the barrier and the leg.

Figure 3:
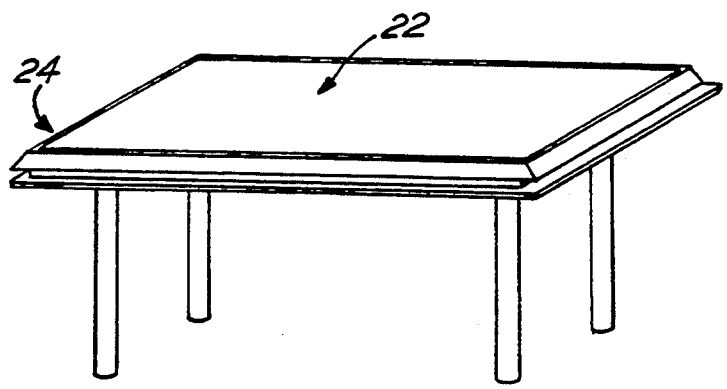
FIG. 3 is an illustration of another embodiment of a plant table having a crawling insects barrier attached to the outer edge of the table to prevent crawling pests from gaining access to the top of the table.

As shown in FIG. 3, an attractant supporting structure 22 includes a top guard barrier 24 located at the peripheral edge of the top of structure 22. Top guard barrier 24 may be manufactured as an integral part of the top of structure 22 or may be manufactured as a separate item which is affixed to the peripheral edge of the structure top. Structure top barrier 24 forms a continuous loop following the entire periphery of the top of structure 22.

As shown in FIG. 4, a flower pot 26 includes a holder or guard 28 which carries a barrier 38 located at the periphery of the guard. As shown in FIG. 5, flower pot guard 28 includes a base support 42 which supports flower pot 26. Flower pot guard 28 has a physical barrier 38 formed at the periphery of the flower pot guard. Flower pot guard 28 has ridges 32 extending from support base 42 of flower pot guard 28. A water hole 44 is formed in the bottom of the flower pot allowing water to run through the pot and collect in guard 28. A plurality of circular ridges 32 are formed on base support 42 and serve to support flower pot 26. Pot 26 may merely rest on ridges 32 and need not be fixed thereto. FIGS. 1 through 5 illustrate embodiments of a crawling pest preclusion barrier adapted to prevent damage or infestation to plants, trees, or edible items by crawling pests. The present invention may be understood from a description of the structure and function common to all embodiments of the invention. Referring to FIG. 6, a barrier 15 is shown which may be used as barriers 10, 12, 24, 38. Barrier 15 includes an outer obstacle wall 39, which cooperates with a side wall 20 to form a partially enclosed barrier area 45, which prevents crawling insects and other crawling pests from gaining access to outer surface 41 of obstacle wall 39. A plate member 18 extends from side wall 20 generally in the direction of obstacle wall 39. Plate member 18 approaches obstacle wall 39 to a distance not less than X. Barrier 15 is positioned such that crawling pests must first encounter barrier 15 at plate member 18. Distance X is of sufficient magnitude to prevent the crawling pests from physically reaching obstacle wall 39 from plate member 18. Surfaces 18A, 18B, 17A and 17 provide a first pathway which is the sole pathway for crawling pests to reach the protected plant, plant section, tree, or attractant.

The first pathway leads to a second pathway formed by surfaces 35a, 47, 42 and 41. The first and second pathways connect in tandem and form a pathway which must be used by the crawling pest to reach the ridge 35 and subsequently, the attractant supporting section of the structure or the susceptible region of the plant, tree, or attractant supporting structure.

The spacing between inside surface 47 of the outer obstacle wall 39 and the outer surface 17 of side wall 20, must not be too small. As shown in FIG. 6, surface 47 is spaced from surface 17 by a maximum distance Z, and a minimum distance Y. Distance Z must be as large or larger than X, so that the crawling pest will be required to travel between the two surfaces 47 and 17 as it makes its upward climb along surface 17.

As the insect reaches point 113 on surface 17, it is at a point approximately X distance from obstacle wall 39. The crawling pest must travel at least between top surface 17A and point 113 before it can reach over to surface 47 of outer obstacle wall 39. This distance from top surface 17A to point 113 must be sufficient to draw the crawling pest into the barrier area 45 between walls 20 and 39 so that one or more of the following conditions occur: 1) the crawling pests' -tactic responses will be confused, 2) the insect elevation topographic sensing capabilities become disoriented, 3) the insect electrical impulse sensing (seeking) capabilities become less effective, 4) the insect heat sensing (seeking) capabilities become less effective 5) the intensity of the ultraviolet light becomes insufficient for navigation and orientation purposes by the crawling pest, and 6) the insect olfactory sensing capabilities will become confused. For example, with the distance X equal to three-eighths inches, point 113 should be approximately one and one-half inches from top surface 17A of plate member 18 if the barrier is installed with plate member 18 in a horizontal position. However, this distance will vary with the angle of the installation with respect to the horizontal as well as the distance the device is mounted above ground.

In use, the crawling pest preclusion barrier is installed in one or more of the support structure, plant, or tree regions shown in FIGS. 1, 2, 3, 4 and 5. The barrier 15 1) creates a mechanical barrier or maze which disturbs or disorients the crawling pests foraging activity; 2) increases the crawling pests Area Restricted Search (ARS) time making homing orientation more time consuming for a forager that may have reached the barrier; 3) disrupts communication among crawling pests during the organization phase of the cooperative search and foraging; 4) creates an open space (X) that exceeds the combined body and leg length of the crawling pest to be precluded which a) prevents the pest from "pulling itself up" from plate 18 onto wall 39, and b) prevent circumventing the barrier by the building of a structure by the crawling pest; 5) disrupts the trail pheromones of various crawling pests that may have reached the attractant supporting structure region of a structure or susceptible region of a plant or tree which is protected by the barrier, and may have jumped from obstacle wall 39 to plate member 18; and 6) attenuates the ultraviolet light used for navigation and orientation by crawling pests.

Crawling insects or other crawling pests search for food, shelter or other desired objects in several modes: Area Restricted Search, olfaction, heat sensing (seeking) capabilities, electrical impulse sensing (seeking) capabilities, trail pheromones, visual cues and numerous sensorial modalities. Crawling insects or other crawling pests may initially locate food or other some other objective by some combination of Area Restricted Search, vision, odor, heat sensing and/or electrical sensing modes in combination with the highly developed internal topographic map developed using multiple sensorial modalities and polarized or unpolarized ultraviolet light from natural or artificial sources. Once the food or other desired objective is discovered, a trail pheromone may be deposited by the successful forager as it returns to home (nest). Some portion of an insect's colony may follow the trail pheromone to the source of the food or other objective. The mechanical barriers of the present invention disrupt and/or disorient the crawling pests' foraging activities.

The mechanical barrier disrupts or disorients foraging activity in a multiplicity of ways. Crawling insects may have -tactic responses. A taxis is a reflexive or orientation movement by insects in relation to a source of stimulation. Example taxes are photo (light), thigmo (contact, especially with a solid object), geo (gravity), etc. Taxes may be used individually (one at a time), concurrently (more than one at a time), serially (one after another), and most taxes may be either positive or negative. Insects may switch taxes rapidly and they may switch from positive to negative or vice versa, rapidly. The use of taxes by insects may vary with either or both the environmental states and/or current states of the insect. Given this, obstacle wall 39 shades the outer surface 17 of the pest preclusion device side wall 20 and barrier area 45 from light rays, as represented by light rays 51 and 53 in FIG. 6. As shown in FIG. 6, a shadow 55 appears on member 18, 20 and pathway 17a beneath obstacle wall 39. The intensity of light within barrier area 45 is typically lower than the intensity of light outside the barrier due to the shading of light by wall 39.

If the insect is currently utilizing only its positive phototactic response mode, that is, it prefers to move toward light rather than away from light, as the insect moves along pathway 17A of plate member 18, it moves into the shadow 55 (FIG. 6) cast by obstacle wall 39. The shadow deters the insect from entering the barrier area 45 between the obstacle wall and side walls 20. However, if the insect begins to climb the outer surface or pathway 17 of outer wall 20 to enter the barrier area 45, the insect approaches a progressively darker area within the barrier area 45. The insects' response tendency may be to make a positive phototactic choice and exit barrier area 45 back towards the light.

If the insect does not retreat back down outer surface 17, it will climb outer surface 17 of side wall 20 towards ridge 35. When the insect reaches surface 35A, it places itself in a position where all choices of further movement are positively phototactic. If the insect is in either a negative phototactic response mode, or alternating between positive and negative phototactic response modes, barrier area 45 would disorient or disrupt foraging and search activity. If the insect is currently or serially utilizing other tactic response modes, the disorientation/disruption would become more severe. For example, if the objective was initially located through olfactory senses, the insect would utilize, among other, the geotactic response mode to establish an elevation topographic reference point. If the insect was concurrently operating in a negative thigmotactic response mode, it would not climb surface 17 of side wall 20 when it was encountered. If it switched to a positive thigmotactic response mode, it would climb surface 17 of side wall 20. As it climbed surface 17, the olfactory responses would diminish as it entered barrier area 45. Since it was previously operating either concurrently or serially in a geotactic response mode, it would receive conflicting stimuli. That is, the olfactory modality indicated the presence of a food supply or other objective. As the insect climbs surface 17 to approach the area which the olfactory sense identified, the geotactic response mode would provide positive reinforcement while the olfactory modality would provide negative reinforcement. The result would be disorientation of the insect. The insect would then switch -tactic responses to provide clarification. For example, it could switch to positive and/or negative phototactic response modes. If it were positive, and switched to a negative phototactic response, it would again become disoriented when it reached surface 35A. When all choices of movement would be phototactically positive. If it switched to a positive phototactic response mode, at that point, it would most likely return from its original direction back down surface 17. Barrier area 45 effectively disorients the insects' combined sensorial modalities, and -tactic responses. The insects' heat sensing (seeking) responses and the electrical impulse sensing (seeking) responses would be affected similarly to the olfactory responses.

Referring to FIG. 7, insects utilize the ultraviolet portion of the light spectrum for navigation and orientation with respect to food, water, shelter and other objectives of importance. Ultraviolet light sources may be natural or artificial and are used by insects twenty-four hours a day in any type of weather, unless the insects are under a barrier that effectively blocks ultraviolet light, such as metal. Barrier area 45 attenuates the intensity of the ultraviolet spectrum by absorption, reflection and light scattering. The ultraviolet spectrum loses its ability to provide navigation and orientation cues when it drops below a specified intensity level. Barrier area 45 effectively attenuates the ultraviolet light so that insects become disoriented when it is no longer effective for orientation or navigation. When disorientation occurs, the insect attempts to remove itself from barrier area 45 in order to regain the ultraviolet navigation and orientation spectrum. The point at which the insect loses its ability to navigate by ultraviolet light is variable, depending on: 1) the intensity of the ultraviolet light source (e.g., sun's ultraviolet is more intense than moon's ultraviolet source), 2) the color and composition of plate member 18, pathway 17 and 17A, 3) the coarseness or smoothness of pathway 17 and pathway 17A and plate member 18 and 4) the color, composition and material of the insect preclusion barrier. Each of these four factors affect the degree of absorption, reflection and light scattering of ultraviolet light. Therefore, point 113 in FIG. 7 should be located at a point where the ultraviolet light has attenuated to a level sufficient to confuse the insects' navigation and orientation systems.

Referring to FIG. 7, ray 121 representative of ultraviolet light of a certain intensity radiates as shown by arrows into barrier area 45. The intensity of ray 121 is represented by its thickness. At points A, B, C, and D, the intensity of the ultraviolet light ray 121 is attenuated due to: 1) absorption; 2) light scattering; and 3) reflection. Point D is the location of point 113 in FIG. 6.

Stereokinesis is an undirected movement which occurs when a crawling insect encounters an orthogonal surface such as sidewall 20 or the interior ridge surface 35A. Specifically the response mode of the insect when it encounters a circular or straight surface which is orthogonal to its direction of movement is that it chooses to follow the new surface structure rather than climb the route of the vertical wall. The stereokinetic response mode effect in conjunction with the disruption of the -tactic response modes and disruption and attenuation of the ultraviolet light sources used for navigation produce disorientation in the insect.

The preceding illustration may be expanded to the extent of the statistical permutations of the combined sensorial modalities, -tactic responses, stereokinetic movements of the insect, and the degree of attenuation of the ultraviolet light used by the insects to navigate and to orient itself.

A search mode used by crawling insects is Area Restricted Search (ARS). Several methods of foraging or search activity exists within ARS; however, the design of the various embodiments has the same affect on all forms of ARS. Referring to FIGS. 6 and 7, the affect is that it increases search time through the use of surfaces 17A, 17, 35A and surface 47 as opposed to a single exterior surface. The distance travelled in foraging activity is approximately three times further in the illustrated embodiment. The increased ARS time makes homing orientation for the crawling insect more time consuming which puts it at a comparative time disadvantage with competing foragers.

In addition to the ARS time disadvantages created by the present invention, a forager that does reach the plant, susceptible section of the plant, or other attractant has a second disadvantage. When the insect's objective is discovered, it may deposit a trail pheromone which is volatile. Trail pheromones are specific scents used as a communication method to indicate the presence of a food or other objective that is desired by the rest of the colony. A portion of the colony subsequently follows the trail pheromone. Because of the increased time for homing due to surfaces 17A, 17, 35A and 47, the volatile characteristic of the deposited trail pheromones will produce three affects: a weaker odor (trail pheromone) signifying an unimportant food or objective source; no odor (pheromone) indicating no food or objective source; and/or a trail pheromone that, when compared to the trail pheromones of other foragers which have discovered an objective at approximately the same time, is comparatively uninteresting with respect to locating the objective source. Disruption of the communication process described above during the organization phase of cooperative search and foraging is known to be very dysfunctional to successfully accessing an objective source by a colony of crawling insects. The organization phase refers to the recruiting of harvesters by the foragers.

As described above distance X is greater than the combined length of the legs and body of a crawling pest. The crawling pest is prevented from pulling itself up from plate member 18 to obstacle wall 39. Should a crawling pest reach an area above ridge 35 in an attractant supporting region of a structure or a susceptible region of a plant, or tree, the insect may begin to deposit a trail pheromone on surface 41 of obstacle wall 39 as it leaves the desired objective. When the insect reaches the bottom of obstacle wall 39 (FIGS. 6 and 7); it may elect to "jump" to upper surface 17A of plate member 18. In that event, the trail pheromone will not be continuous. The forager will return to home and a portion of the colony will follow the trail pheromone to the point of discontinuity. The insects' access to the objective will be precluded because a continuous trail of pheromone does not exist.

Since insects may use air borne scents to discover food, once the insect is within barrier area 45 between obstacle wall 39 and side wall 20, scent from the food is not as potent thereby creating confusion to this sensorial capability. The scent travels around obstacle wall 39 and enters the barrier area 45 from the plate member or outside. This directs the insect to return to pathway 17A and to exist barrier area 45 rather than continuing the food search within the barrier area.

Referring to FIG. 7, to provide a further barrier, if desired, insect poison or repellant may be placed on either or both of the inside surfaces 47 and 17 of the barrier area. Additional repellant may be placed in barrier area 45. The poison and/or repellant may be of several types: spray, liquid, gel, or adhesive.

FIG. 8 represents another embodiment of the present invention which may be optimal for some applications. In particular those applications in which the barrier is positioned around a plant, tree or structure which is not in a protected structure and which may be subjected to blowing leaves, pine needles or other debris. When installed in the orientation illustrated in FIG. 8, the opening to barrier area 45 is sheltered by obstacle wall 39 diminishing the possibility of debris entering or becoming lodged within the entrance to barrier area 45. The dimension X and the functioning of this embodiment of the present invention is as described above.

FIG. 9 illustrates an embodiment of the present invention including an offset or thickened portion 43, for making an insect preclusion device more durable. The distance X that the lower edge of the outer obstacle wall 39 is above upper surface 17A of plate member 18 is as described above. In addition, the distance should be sufficient to prevent deposition of foreign materials (such as leaves, pine needles, etc.) that would provide a bridge for insects to circumvent the barrier. For example, if the largest of the crawling insects to be precluded is expected to be approximately ½ of one inch in length, the bottom of the outer obstacle wall 39 should be established at approximately ¾ of an inch above upper surface 17A, that is a height such that the insect cannot pull itself up on to wall 39.

FIG. 10 illustrates an embodiment of the present invention which is adapted to retain poison or repellant within the barrier. Receptacles 81 and 83 on surfaces 17 and 47 respectively provide locations at which poison or repellant may be placed. A port 87 may be provided through outer obstacle wall 39 to provide a means for replenishing poison or repellant in receptacles 81 and 83. Additional repellant or poison may be placed in receptacle 85 formed at the lowest extent of surface 41.

FIG. 11 illustrates another embodiment in which additional physical obstacles 59, 60 and 61 may be secured to obstacle wall 39. The additional obstacles 59, 60, 61 cooperate with obstacle wall 39 in order to provide additional barrier areas 63 and 65 for providing additional barriers operating in a similar manner to that previously described for barrier area 45.

FIG. 12 is another modification. Upper device lip 37 is elongated in such a manner that obstacle wall 39 extends downwardly and inwardly toward support wall 20. Barrier area 45 operates in a previously described manner, however, the horizontal distance X occurs at the lowest point of obstacle wall 39. Upper device lip 37B may also be constructed in a nonlinear method as illustrated by the dotted line. This modification may be used if the device is to be installed in positions or locations in which there is a likelihood that foreign objects (such as leaves, weeds, grass, pine needles, etc.) may lodge between any portion of plate member 18 and obstacle wall 39. The deposit of such foreign objects, as stated, would provide a "bridge" which would allow crawling insects or other crawling pests to bypass barrier area 45 and thereby gain access to the attractant supporting section of the structure or the susceptible area of the plant or tree. In the modification shown in FIG. 12, the maximum distance Z will determine the length which upper device lip 37 or 37B will be elongated and thereby establishing the distance between inner surface 47 and outer surface 49. The purpose of the modification is to increase the difficulty with which the effectiveness of the invention may be reduced by fallen or windblown foreign objects.

FIG. 13 illustrates another alternate embodiment of the present invention. Plate member 18 may be attached to support member 20 by attachment methods including friction, use of slotted grooves, use of bonding agents, any attachment method, or any combination of the preceding attachment methods.

In some cases, plate 18 may be removed and the length of obstacle wall 39 extended in such a manner as to provide an adequately dense shadow within the barrier area 45. This attenuates ultra-violet light sufficiently to disorient the insect and serves to disrupt the insect's phototactic, ultraviolet orientation, and other orientation-navigation systems. The extent to which obstacle wall 39 is lengthened depends upon the amount and the direction of light. For example, if obstacle member 39 is located where little light reaches barrier area 45, plate member 18 may be removed. However, where direct or indirect light comes from beneath area 45 then disc member 18 is needed.

Crawling insect or other crawling pest preclusion barriers as shown and described for FIGS. 6 through 13 may be used as barriers 10, 12, 24, 28, 38, as shown in FIGS. 1 through 5. When used as a tree guard as illustrated in FIG. 1, sidewall 20 must conform to the trunk of the tree to preclude a crawling insect or other crawling pest from passing between side wall 20 and the tree. Plate member 18 and obstacle wall 39 would extend away from the trunk of the tree to which the barrier is applied. The barrier must be fabricated of a material sufficiently compliant to continuously conform to the trunk of the tree around the circumference of the trunk of the tree. A filler or bonding agent normally would be applied between the device and the tree so that no openings would exist between the tree and the barrier device.

The barrier may be manufactured in 3 or 4 pieces, for example, which will snap or slide together to form the unit. Alternatively, the barrier may be formed of one molded piece.

While only preferred embodiments of the invention have been described hereinabove, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended claims, rather than by the foregoing description, and all changes which come within the meaning and range of equivalency of the claims are intended to be embraced herein.

What is claimed is:

1. A crawling pest barrier for attachment to the trunk of a tree between the ground and the upper portion of the tree, which prevents a crawling pest of a predetermined size from reaching the upper portion of the tree without the need for chemical repellents, comprising:

a generally cylindrical support member which closely conforms to the trunk of the tree preventing crawling pests from passing between the support member and the tree and extending along the trunk of the tree from a ground side end to an upper end and having an outer surface facing outwardly from the tree;

a projecting member extending outwardly from the outer surface of the support member, the projecting member having an underside surface, an edge surface, and a topside surface, and said protecting member surfaces and said outer surface forming a first pathway for movement there along by the crawling pest from beneath said projecting member to the upper end of the outer surface;

an obstacle member secured to the support member above the projecting member for blocking movement of a crawling pest along the first pathway, the obstacle member having an inside surface ending in an edge separated from the topside surface by a distance greater than the predetermined size, the inside surface providing a second pathway leading in a direction away from the upper end of the support member and away from the first pathway, the obstacle member being spaced from the outer surface a sufficient distance to form a phototactic barrier along the first pathway by shadowing thereof to discourage continued movement by a pest along the first pathway toward the upper portion of the tree; and second obstacle means having a surface depending toward the ground and being spaced from said inside surface forming a second barrier area for providing multiple -tactic and ultraviolet light barriers.

2. A crawling pest barrier for use with an attractant supporting structure which prevents a crawling pest of a predetermined size from access to the section of the structure adjacent to a supported attractant without the need for chemical repellents, comprising:

a support member closely and continuously conforming to the attractant supporting structure and extending from an upper edge near a section of the structure adjacent to the attractant toward a section of the structure in contact with a region from which crawling pests may gain access to the structure; and having an outer surface facing away from the structure;

a projecting member extending outwardly from the outer surface of the support member at a location spaced apart from the upper edge; the projecting member having an underside surface, an edge surface, and a topside surface, and said projecting member surfaces and the outer surface forming a first pathway for movement therealong by the crawling pest from a region adjacent to the projecting member opposite the upper end of the outer surface to the upper end of the outer surface;

an obstacle member secured to the support member, spaced apart from the projecting member in a direction toward the upper end of the outer surface, for blocking movement of a crawling pest along the first pathway, the obstacle member having an inside surface ending, in an edge separated from the topside surface by a distance greater than the predetermined size, the inside surface providing a second pathway leading in a direction away from the upper end of the support member and away from the first pathway, the obstacle member spaced apart from the outer surface a sufficient distance to form a phototactic barrier along the first pathway by shadowing thereof to discourage continued movement by a pest along the first pathway toward a section of the structure adjacent to a supported attractant; and second obstacle means having a surface depending toward the section of the structure in contact with a region from which crawling pests may gain access to the structure and being spaced apart from the inside surface forming a second barrier area for providing multiple -tactic and ultraviolet light barriers.

3. A crawling pest barrier for attachment to the trunk of a tree between the ground and the upper portion of the tree, which prevents a crawling pest of a predetermined size from reaching the upper portion of the tree without the need for chemical repellents, comprising:

a generally cylindrical support member which closely conforms to the trunk of the tree preventing crawling pests from passing between the support member and the tree and extending along the trunk of the tree from a ground side end to an upper end and having an outer surface facing outwardly from the tree;

a projecting member extending outwardly from the outer surface of the support member, said projecting member having an underside surface, an edge surface, and a topside surface, and said projecting member surfaces and said outer surface forming a first pathway for movement therealong by the crawling pest from beneath said projecting member to the upper end of the outer surface, said topside surface being free of a liquid chemical; and an obstacle member secured to the support member above the projecting member for blocking movement of a crawling pest along the first pathway, the obstacle member having an inside surface ending in an edge separated from the topside surface by a distance greater than the predetermined size, the inside surface providing a second pathway leading in a direction away from the upper end of the support member and away from the first pathway, the obstacle member being spaced from the outer surface a sufficient distance to form a phototactic barrier along the first pathway by shadowing thereof to discourage continued movement by a pest along the first pathway toward the upper portion of the tree.

4. A crawling pest barrier for use with an attractant supporting structure which prevents a crawling pest of a predetermined size from access to the section of the structure adjacent to a supported attractant without the need for chemical repellents, comprising:

a support member closely and continuously conforming to the attractant supporting structure and extending from an upper edge near a section of the structure adjacent to the attractant toward a section of the structure in contact with a region from which crawling pests may gain access to the structure and having an outer surface facing away from the structure;

a projecting member extending outwardly from the outer surface of the support member at a location spaced apart from the upper edge, said projecting member having an underside surface, an edge surface, and a topside surface, and said projecting member surfaces and the outer surface forming a first pathway for movement therealong by the crawling pest from a region adjacent to the projecting member opposite the upper end of the outer surface to the upper end of the outer surface, said topside surface being free of a liquid chemical; and an obstacle member secured to the support member, spaced apart from the projecting member in a direction toward the upper end of the outer surface, for blocking movement of a crawling pest along the first pathway, the obstacle member having an inside surface ending in an edge separated from the topside surface by a distance greater than the predetermined size, the inside surface providing a second pathway leading in a direction away from the upper end of the support member and away from the first pathway, the obstacle member spaced apart from the outer surface a sufficient distance to form a phototactic barrier along the first pathway by shadowing thereof to discourage continued movement by a pest along the first pathway toward a section of the structure adjacent to a supported attractant.

5. A crawling pest barrier flower pot guard for supporting a flower pot and preventing access to the flower pot by crawling pests of a predetermined size without the need for chemical repellents, comprising:

a continuous base sized to support a flower pot and having an outer periphery surrounding the flower pot;

a supporting member secured to and extending from the outer periphery of the base, and continuous around the outer periphery, and extending from a region adjacent to the flower pot guard from which crawling pests may gain access to the flower pot guard to an upper edge spaced apart from the flower pot guard adjacent region, the supporting member having an outer surface facing away from the base;

a projecting member extending outwardly from the outer surface of the support member at a location spaced apart from the upper edge, said projecting member having an underside surface, an edge surface, and a topside surface, and said projecting member surfaces and the outer surface forming a first pathway for movement therealong by the crawling pest from a region adjacent to the projecting member opposite the upper end of the outer surface to the upper end of the outer surface, said topside surface being free of a liquid chemical; and an obstacle member secured to the support member, spaced apart from the projecting member in a direction toward the upper end of the outer surface, for blocking movement of a crawling pest along the first pathway, the obstacle member having an inside surface ending in an edge separated from the topside surface by a distance greater than the predetermined size, the inside surface providing a second pathway leading in a direction away from the upper end of the support member and away from the first pathway, the obstacle member spaced apart from the outer surface a sufficient distance to form a phototactic barrier along the first pathway by shadowing thereof to discourage continued movement by a pest along the first pathway toward a section of the base supporting a flower pot.

6. A crawling pest barrier for attachment to the trunk of a tree between the ground and the upper portion of the tree, which prevents a crawling pest of a predetermined size from reaching the upper portion of the tree without the need for chemical repellents, comprising:

a generally cylindrical support member which closely conforms to the trunk of the tree preventing crawling pests from passing between the support member and the tree and extending along the trunk of the tree from a ground side end to an upper end and having an outer surface facing outwardly from the tree;

a projecting member extending outwardly from the outer surface of the support member, said projecting member having an underside surface, an edge surface, and a topside surface, and said projecting member surfaces and said outer surface forming a first pathway for movement therealong by the crawling pest from beneath said projecting member to the upper end of the outer surface; and an obstacle member secured to the support member above the projecting member for blocking movement of a crawling pest along the first pathway, the obstacle member having an inside surface ending in an edge separated from the topside surface by a distance greater than the predetermined size, the inside surface providing a second pathway leading in a direction away from the upper end of the support member and away from the first pathway, said inside surface of said obstacle member having a point of greatest diameter and tapering radially inwardly from said point of greatest diameter to said edge, said edge being disposed closer to said outer surface than said point of greatest diameter, the obstacle member being spaced from the outer surface a sufficient distance to form a phototactic barrier along the first pathway by shadowing thereof to discourage continued movement by a pest along the first pathway toward the upper portion of the tree.

7. A crawling pest barrier for use with an attractant supporting structure which prevents a crawling pest of a predetermined size from access to the section of the structure adjacent to a supported attractant without the need for chemical repellents, comprising:

a support member closely and continuously conforming to the attractant supporting structure and extending from an upper edge near a section of the structure adjacent to the attractant toward a section of the structure in contact with a region from which crawling pests may gain access to the structure and having an outer surface facing away from the structure;

a projecting member extending outwardly from the outer surface of the support member at a location spaced apart from the upper edge, said projecting member having an underside surface, an edge surface, and a topside surface, and said projecting member surfaces and the outer surface forming a first pathway for movement therealong by the crawling pest from a region adjacent to the projecting member opposite the upper end of the outer surface to the upper end of the outer surface; and an obstacle member secured to the support member, spaced apart from the projecting member in a direction toward the upper end of the outer surface, for blocking movement of a crawling pest along the first pathway, the obstacle member having an inside surface ending in an edge separated from the topside surface by a distance greater than the predetermined size, the inside surface providing a second pathway leading in a direction away from the upper end of the support member and away from the first pathway, said inside surface of said obstacle member having a point of greatest diameter and tapering radially inwardly from said point of greatest diameter to said edge, said edge being disposed closer to said outer surface than said point of greatest diameter, the obstacle member spaced apart from the outer surface a sufficient distance to form a phototactic barrier along the first pathway by shadowing thereof to discourage continued movement by a pest along the first pathway toward a section of the structure adjacent to a supported attractant.

8. A crawling pest barrier flower pot guard for supporting a flower pot and preventing access to the flower pot by crawling pests of a predetermined size without the need for chemical repellents, comprising:

a continuous base sized to support a flower pot and having an outer periphery surrounding the flower pot;

a supporting member secured to and extending from the outer periphery of the base, and continuous around the outer periphery, and extending from a region adjacent to the flower pot guard from which crawling pests may gain access to the flower pot guard to an upper edge spaced apart from the flower pot guard adjacent region, the supporting member having an outer surface facing away from the base;

a projecting member extending outwardly from the outer surface of the support member at a location spaced apart from the upper edge, said projecting member having an underside surface, an edge surface, and a topside surface, and said projecting member surfaces and the outer surface forming a first pathway for movement therealong by the crawling pest from a region adjacent to the projecting member opposite the upper end of the outer surface to the upper end of the outer surface; and an obstacle member secured to the support member, spaced apart from the projecting member in a direction toward the upper end of the outer surface, for blocking movement of a crawling pest along the first pathway, the obstacle member having an inside surface ending in an edge separated from the topside surface by a distance greater than the predetermined size, the inside surface providing a second pathway leading in a direction away from the upper end of the support member and away from the first pathway, said inside surface of said obstacle member having a point of greatest diameter and tapering radially inwardly from said point of greatest diameter to said edge, said edge being disposed closer to said outer surface than said point of greatest diameter, the obstacle member spaced apart from the outer surface a sufficient distance to form a phototactic barrier along the first pathway by shadowing thereof to discourage continued movement by a pest along the first pathway toward a section of the base supporting a flower pot.

9. A crawling pest barrier for attachment to the trunk of a tree between the ground and the upper portion of the tree, which prevents a crawling pest of a predetermined size from reaching the upper portion of the tree without the need for chemical repellents, comprising:

a generally cylindrical support member which closely conforms to the trunk of the tree preventing crawling pests from passing between the support member and the tree and extending along the trunk of the tree from a ground side end to an upper end and having an outer surface facing outwardly from the tree;

a projecting member extending outwardly from the outer surface of the support member, said projecting member having an underside surface, an edge surface, and a topside surface, and said projecting member surfaces and said outer surface forming a first pathway for movement therealong by the crawling pest from beneath said projecting member to the upper end of the outer surface; and an obstacle member secured to the support member above the projecting member for blocking movement of a crawling pest along the first pathway, the obstacle member having an inside surface ending in an edge separated from the topside surface by a distance greater than the predetermined size, the inside surface providing a second pathway leading in a direction away from the upper end of the support member and away from the first pathway, the obstacle member being spaced from the outer surface a sufficient distance to form a phototactic barrier along the first pathway by shadowing thereof to discourage continued movement by a pest along the first pathway toward the upper portion of the tree; and said edge surface of said projecting member extending at least as far radially outwardly as said edge of said obstacle member, with respect to said outer surface of said support member.

10. A crawling pest barrier for use with an attractant supporting structure which prevents a crawling pest of a predetermined size from access to the section of the structure adjacent to a supported attractant without the need for chemical repellents, comprising:

a support member closely and continuously conforming to the attractant supporting structure and extending from an upper edge near a section of the structure adjacent to the attractant toward a section of the structure in contact with a region from which crawling pests may gain access to the structure and having an outer surface facing away from the structure;

a projecting member extending outwardly from the outer surface of the support member at a location spaced apart from the upper edge, said projecting member having an underside surface, an edge surface, and a topside surface, and said projecting member surfaces and the outer surface forming a first pathway for movement therealong by the crawling pest from a region adjacent to the projecting member opposite the upper end of the outer surface to the upper end of the outer surface; and an obstacle member secured to the support member, spaced apart from the projecting member in a direction toward the upper end of the outer surface, for blocking movement of a crawling pest along the first pathway, the obstacle member having an inside surface ending in an edge separated from the topside surface by a distance greater than the predetermined size, the inside surface providing a second pathway leading in a direction away from the upper end of the support member and away from the first pathway, the obstacle member spaced apart from the outer surface a sufficient distance to form a phototactic barrier along the first pathway by shadowing thereof to discourage continued movement by a pest along the first pathway toward a second of the structure adjacent to a supported attractant; and said edge surface of said projecting member extending at least as far radially outwardly as said edge of said obstacle member, with respect to said outer surface of said support member.

11. A crawling pest barrier flower pot guard for supporting a flower pot and preventing access to the flower pot by crawling pests of a predetermined size without the need for chemical repellents, comprising:

a continuous base sized to support a flower pot and having an outer periphery surrounding the flower pot;

a supporting member secured to and extending from the outer periphery of the base, and continuous around the outer periphery, and extending from a region adjacent to the flower pot guard from which crawling pests may gain access to the flower pot guard to an upper edge spaced apart from the flower pot guard adjacent region, the supporting member having an outer surface facing away from the base;

a projecting member extending outwardly from the outer surface of the support member at a location spaced apart from the upper edge, said projecting member having an underside surface, an edge surface, and a topside surface, and said projecting member surfaces and the outer surface forming a first pathway for movement therealong by the crawling pest from a region adjacent to the projecting member opposite the upper end of the outer surface to the upper end of the outer surface; and an obstacle member secured to the support member, spaced apart from the projecting member in a direction toward the upper end of the outer surface, for blocking movement of a crawling pest along the first pathway, the obstacle member having an inside surface ending in an edge separated from the topside surface by a distance greater than the predetermined size, the inside surface providing a second pathway leading in a direction away from the upper end of the support member and away from the first pathway, the obstacle member spaced apart from the outer surface a sufficient distance to form a phototactic barrier along the first pathway by shadowing thereof to discourage continued movement by a pest along the first pathway toward a section of the base supporting a flower pot; and said edge surface of said projecting member extending at least as far radially outwardly as said edge of said obstacle member, with respect to said outer surface of said support member.

12. The crawling pest barrier of claim 6 or 9 wherein the obstacle member includes a generally frustumconical member depending from the open end of the support member toward the ground with increasing diameter, at least a portion of the obstacle member having a diameter greater than the diameter of the outer surface by a distance greater than the predetermined distance.

13. The crawling pest barrier of claim 12 wherein the inside surface is generally frustumconical.

14. The crawling pest barrier of claim 3, 6, or 9 wherein the underside surface and the topside surface are orthogonal to the other surface.

15. The crawling pest barrier of claim 3, 6 or 9 further including a filler interposed between the support member and the trunk of the tree whereby crawling pests are prevented from passing the barrier between the tree and the support member.

16. The crawling pest barrier of claim 3, 6 or 9 wherein the support member, the projecting member, and the obstacle member are formed integrally as a single unit.

17. The crawling pest barrier of claim 4, 7 or 10 wherein the underside surface and the topside surface are orthogonal to the outer surface.

18. The crawling pest barrier of claim 4, 7, or 10 wherein the support member, the projecting member, and the obstacle member are formed integrally as a single unit.

19. The crawling pest barrier of claim 4, 7 or 10 wherein the support member is formed integrally with the attractant supporting structure.

20. The crawling pest barrier of claim 19 wherein the projecting member and the obstacle member are formed integrally with the attractant supporting structure.

21. The crawling pest barrier according to any one of claims 3-11 wherein said topside surface is planar.

* * * * *